(12) United States Patent
Nakanishi et al.

(10) Patent No.: US 8,353,129 B2
(45) Date of Patent: Jan. 15, 2013

(54) WINDOW INTERLOCK

(75) Inventors: Itsuto Nakanishi, Toronto (CA); John P. McCorkell, Barrie (CA)

(73) Assignee: Magna Closures Inc., Newmarket (CA)

( * ) Notice: Subject to any disclaimer, the term of this patent is extended or adjusted under 35 U.S.C. 154(b) by 45 days.

(21) Appl. No.: 13/175,919

(22) Filed: Jul. 4, 2011

(65) Prior Publication Data
US 2012/0000131 A1    Jan. 5, 2012

Related U.S. Application Data

(60) Provisional application No. 61/361,466, filed on Jul. 5, 2010, provisional application No. 61/421,944, filed on Dec. 10, 2010.

(51) Int. Cl.
*E05F 15/16*   (2006.01)
*E05F 11/48*   (2006.01)
*E05F 11/38*   (2006.01)

(52) U.S. Cl. ............................... 49/348; 49/349; 49/372

(58) Field of Classification Search ............ 49/348, 49/349, 352, 372, 502; 292/201, 216; 296/97.22, 296/146.2, 155
See application file for complete search history.

(56) References Cited

U.S. PATENT DOCUMENTS

| | | | | |
|---|---|---|---|---|
| 4,000,581 | A * | 1/1977 | Fukumoto et al. | 49/103 |
| 6,412,222 | B1 * | 7/2002 | Hashiba et al. | 49/168 |
| 6,477,806 | B1 * | 11/2002 | Asada et al. | 49/169 |
| 6,513,285 | B2 * | 2/2003 | Isomura | 49/351 |
| 6,659,539 | B2 * | 12/2003 | Yogo et al. | 296/155 |
| 6,966,148 | B2 * | 11/2005 | Choi | 49/360 |
| 6,971,206 | B2 * | 12/2005 | Fukumoto et al. | 49/351 |
| 7,100,325 | B2 * | 9/2006 | Ichinose | 49/168 |
| 8,069,611 | B2 * | 12/2011 | Kitayama | 49/348 |
| 8,245,447 | B2 * | 8/2012 | Oh | 49/360 |
| 2005/0046230 | A1 * | 3/2005 | Fukumoto et al. | 296/155 |
| 2006/0202507 | A1 * | 9/2006 | Miyagawa et al. | 296/155 |

FOREIGN PATENT DOCUMENTS

| | | |
|---|---|---|
| JP | 2001-288960 | 10/2001 |
| JP | 2007-146475 | 6/2007 |

* cited by examiner

*Primary Examiner* — Katherine w Mitchell
*Assistant Examiner* — Justin Rephann
(74) *Attorney, Agent, or Firm* — Millman IP Inc.

(57) ABSTRACT

In a first aspect, the invention is directed to a window regulator for a vehicle window on a sliding vehicle door. The window regulator includes a ratchet that is positionable in a first position and a second position and a pawl that is positionable in a ratchet release position and a ratchet locking position. The position of the ratchet determines the position of a door interlock member for controlling whether the vehicle door is fully openable or not. The window regulator includes a mechanism for separating the ratchet and pawl from each other prior to movement of at least one of the ratchet and pawl from one of its associated positions to the other of its associated positions. The mechanism preferably separates the ratchet and pawl from each other prior to movement of each of the ratchet and pawl from one of its associated positions to the other of its associated positions.

22 Claims, 17 Drawing Sheets

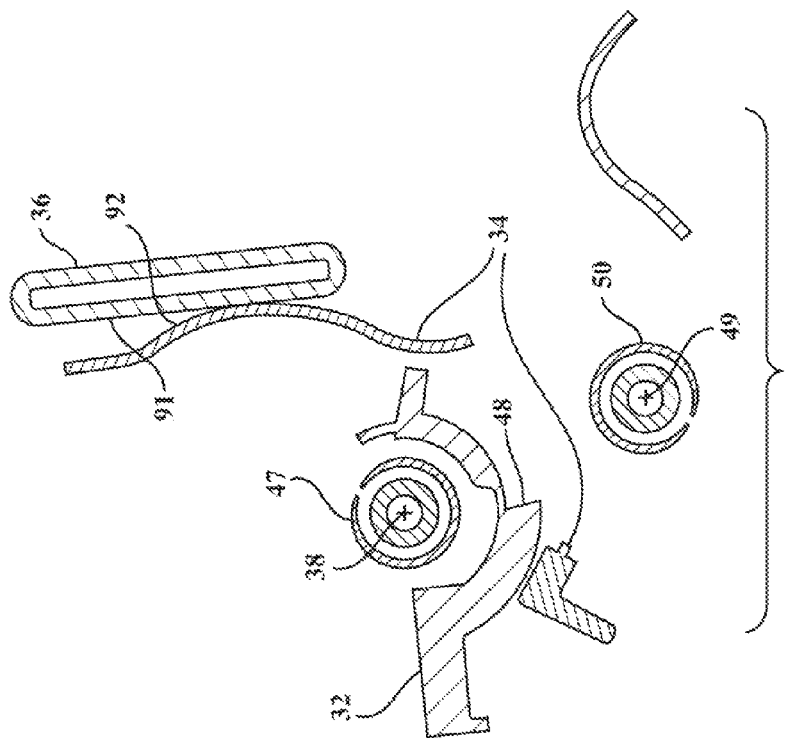
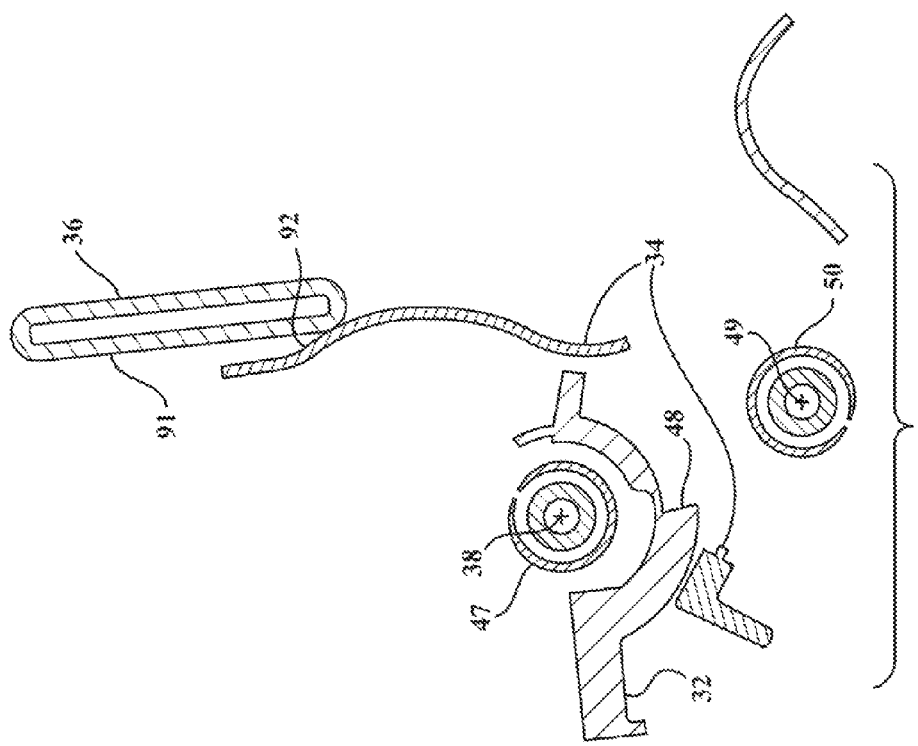

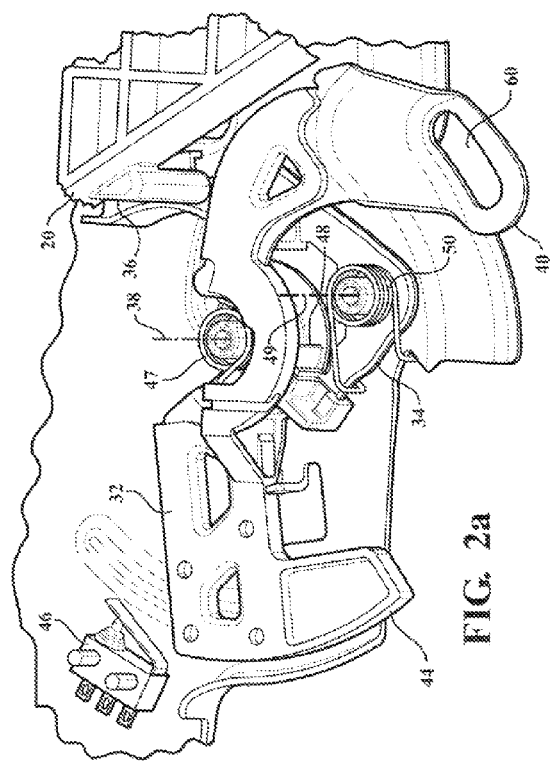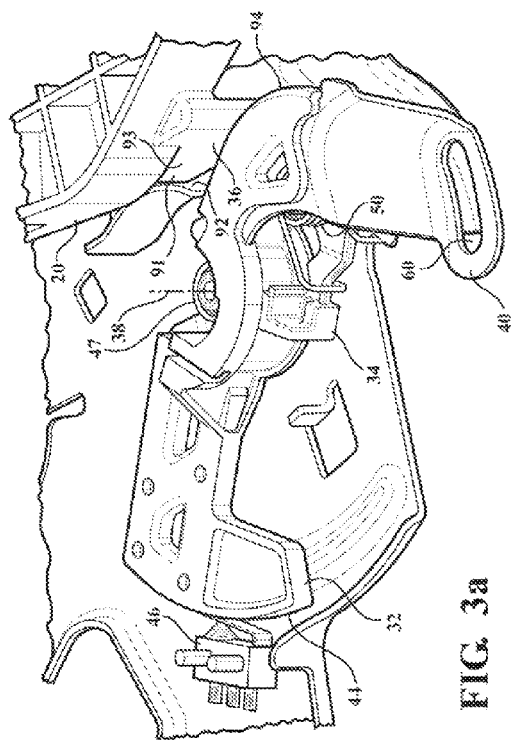

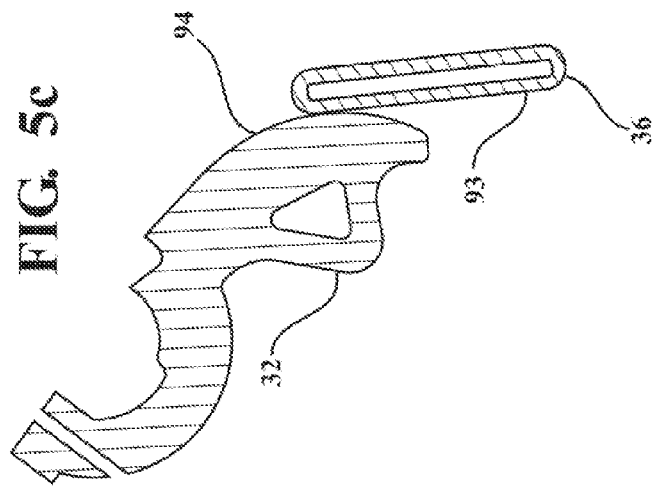
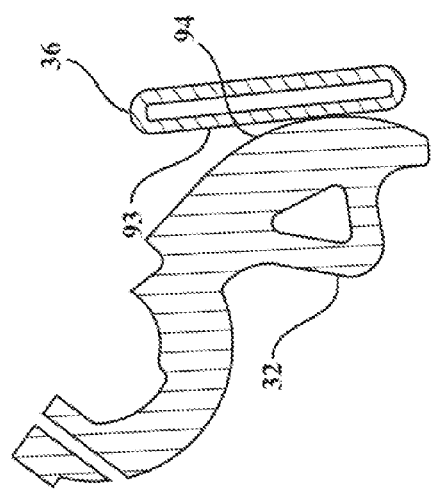
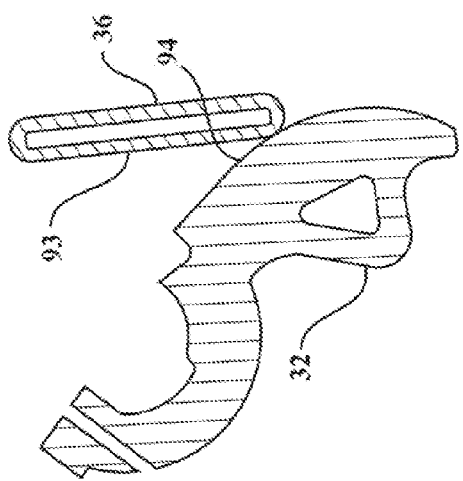

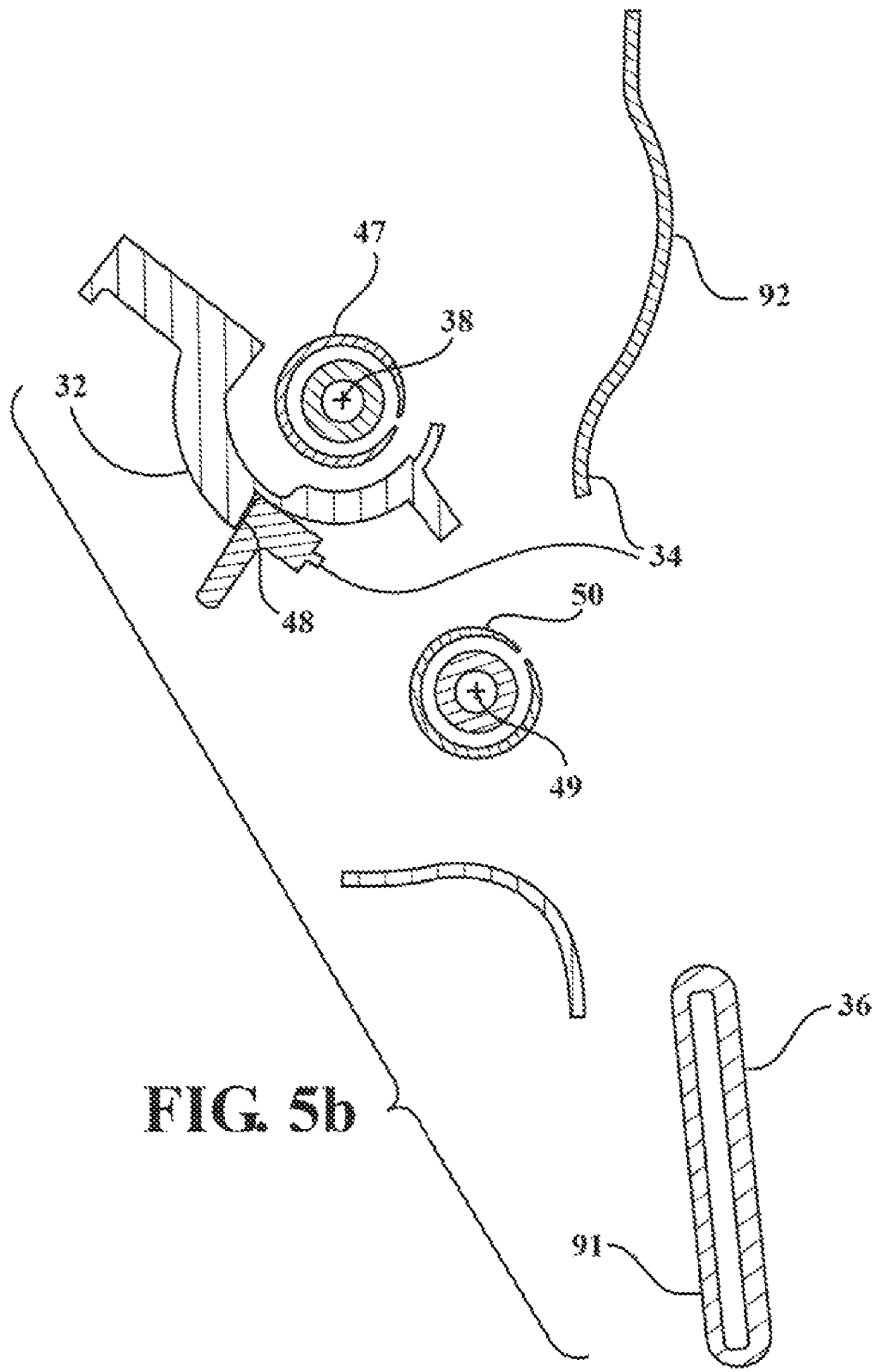

WINDOW INTERLOCK

FIELD OF THE INVENTION

The present invention relates to window interlocks for movable vehicle windows, and more particularly to a window interlock for a movable vehicle window provided on a sliding door of a vehicle.

BACKGROUND OF THE INVENTION

Some vehicles with sliding doors, such as minivans, currently provide windows that raise and lower on the sliding doors. This presents a potential danger to occupants, however, in the event that a sliding door, with its window open, is opened while a part of an occupant's body (eg. their head or arm) extends out through the open window aperture. As the door slides back along the vehicle body, the part of the occupant's body can get trapped between the sliding door window frame and the rear edge of the door aperture on the vehicle body. In order to avoid such a scenario, devices have been proposed that prevent the sliding door from opening beyond a certain point if its window is open more than a selected amount. Such devices include sensing devices which sense whether the sliding door window is open more than a selected amount. These sensing devices are sometimes undesirably loud, however, and suffer from operating problems when their constituent components freeze together in cold climates.

It would be advantageous to provide a sensing device for detecting whether the sliding door window is open beyond a selected amount, which operates relatively quietly and which is relatively less prone to problems in the event that the components are frozen together.

SUMMARY OF THE INVENTION

In a first aspect, the invention is directed to a window regulator for a vehicle window on a sliding vehicle door. The window regulator includes a ratchet that is positionable in a first position and a second position and a pawl that is positionable in a ratchet release position and a ratchet locking position. The position of the ratchet determines the position of a door interlock member for controlling whether the vehicle door is fully openable or not. The window regulator includes a mechanism for separating the ratchet and pawl from each other prior to movement of at least one of the ratchet and pawl from one of its associated positions to the other of its associated positions. The mechanism preferably separates the ratchet and pawl from each other prior to movement of each of the ratchet and pawl from one of its associated positions to the other of its associated positions.

In a particular embodiment of the first aspect, a window regulator for a vehicle window on a sliding vehicle door is provided, comprising a lifter plate, a window drive mechanism, a ratchet and a pawl. The lifter plate is configured to hold the vehicle window and is movable between a fully-open position and a fully-closed position. The window drive mechanism is operatively connected to the lifter plate for driving the movement of the lifter plate between the fully-open and fully-closed positions. The ratchet is movable between a first position and a second position. The ratchet is biased towards the first position. Movement of the ratchet to one of the first and second positions causes movement of a door interlock member to an interlock position to prevent the vehicle door from fully opening. Movement of the ratchet to the other of the first and second positions causes movement of the door interlock member to a bypass position to permit the vehicle door to be fully opened. The lifter plate is operatively connected to the ratchet such that movement of the lifter plate at least to a selected position moves the ratchet from the first position to the second position. The pawl is movable between a ratchet locking position and a ratchet release position. When the pawl is in the ratchet locking position the pawl holds the ratchet in the second position. When the pawl in the ratchet release position the pawl permits the ratchet to move between the first and second positions. The pawl is biased towards the ratchet locking position. The lifter plate is operatively connected to the pawl to move the pawl between the ratchet locking position and the ratchet release position. Movement of the lifter plate causes at least one movement selected from the group consisting of movement of the pawl away from the ratchet prior to movement of the ratchet away from the first position so as to separate the pawl and the ratchet from each other in the event that the pawl and the ratchet become fixedly connected together, and movement of the ratchet away from the pawl prior to movement of the pawl away from the ratchet locking position so as to separate the pawl and the ratchet from each other in the event that the pawl and the ratchet become fixedly connected together. The window regulator may be a cable-and-drum configuration, or a cross-arm configuration.

BRIEF DESCRIPTION OF THE DRAWINGS

The present invention will now be described by way of example only with reference to the attached drawings, in which:

FIG. 1b is a sectional plan view of several components from the window regulator shown in FIG. 1;

FIG. 2a is a perspective view of the portion of the window regulator shown in FIG. 1, in a second position;

FIG. 2b is a sectional plan view of several components from the window regulator in the position shown in FIG. 2a;

FIG. 3a is a perspective view of the portion of the window regulator in the position shown in FIG. 3;

FIG. 3c is another sectional plan view of several components from the window regulator in the position shown in FIG. 3;

FIG. 4b is a sectional plan view of several components from the window regulator in the position shown in FIG. 4a;

FIG. 4c is another sectional plan view of several components from the window regulator in the position shown in FIG. 4a;

FIG. 5b is a sectional plan view of several components from the window regulator in the position shown in FIG. 5;

FIG. 5c is another sectional plan view of several components from the window regulator in the position shown in FIG. 5;

DETAILED DESCRIPTION OF THE DRAWINGS

Figure 8:
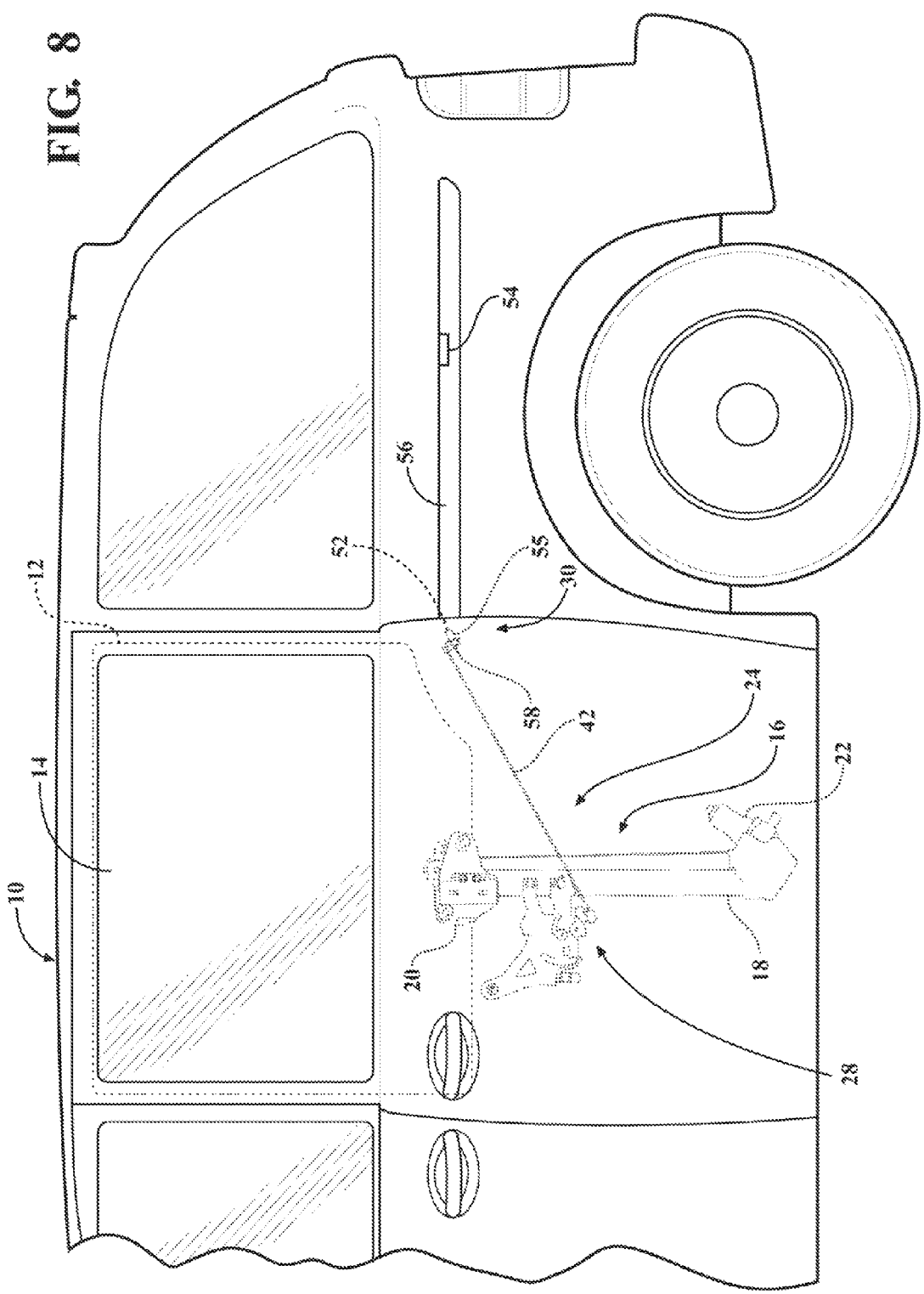
FIG. 8 is a side elevation view of a vehicle with a sliding vehicle door in which the window regulator is mounted, showing a door stop mechanism in a position to permit fully opening the vehicle door.

Reference is made to FIG. 8, which shows a vehicle 10, which has a vehicle door 12, which has a window 14 and a window regulator 16 in accordance with an embodiment of the invention. In the embodiment shown the vehicle 10 is a minivan, and the vehicle door 12 is a sliding rear door, as is commonly provided on minivans.

Figure 6:
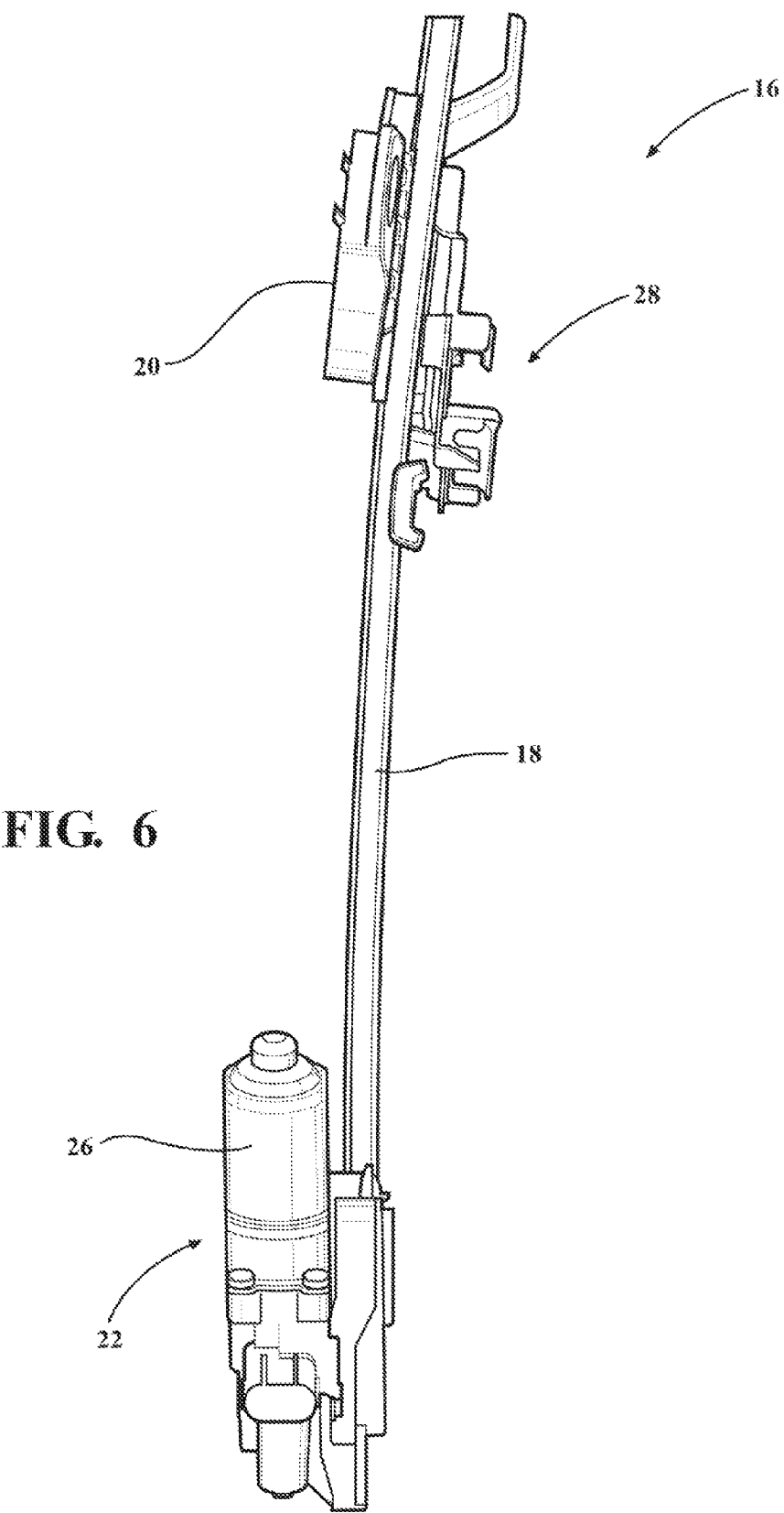
FIG. 6 is a side elevation view of the window regulator.
Figure 7:
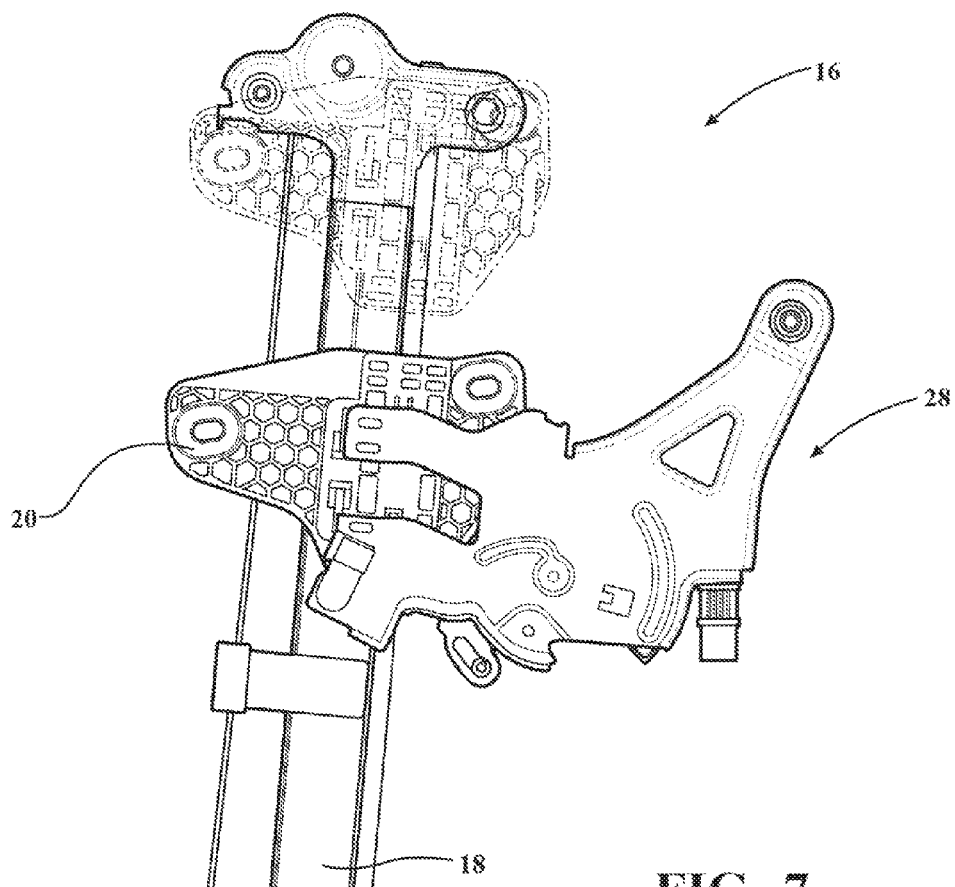
FIG. 7 is a plan view of the window regulator.

Reference is made to FIGS. 6 and 7. The window regulator 16 includes a guide rail 18, a lifter plate 20 that is movable along the guide rail 18, a window drive mechanism 22 that is operatively connected to the lifter plate 20 to drive the lifter plate 20 along the guide rail 18, and a window interlock 24 that determines whether the window 14 is open far enough that it presents a safety danger to a vehicle occupant during opening of the vehicle door 12 (FIG. 8).

The guide rail 18 (FIG. 7) may be made from any suitable material, such as a polymeric material. The guide rail 18 may be mounted inside the vehicle door 12 (FIG. 8) in any suitable way. For example the guide rail 18 may be mounted to an optional carrier panel (not shown) that could be provided inside the vehicle door 12 for holding various door-related components. In a particular embodiment, the guide rail 18 may be integrally formed with the aforementioned carrier panel.

The lifter plate 20 is configured to hold the vehicle window 14 by any suitable means and movable along the guide rail 18 between a fully-open position (shown in dashed outline at the bottom of FIG. 7) and a fully-closed position (shown in dashed outline at the top of FIG. 7).

The window drive mechanism 22 is operatively connected to the lifter plate 20 for driving the movement of the lifter plate 20 between the fully-open and fully-closed positions. In the embodiment shown in FIGS. 6 and 7, the window drive mechanism 22 includes an electric motor 26 and a cable assembly 27 (FIG. 7) that operatively connects the electric motor 26 to the lifter plate 20.

In the embodiment shown, the window regulator 16 incorporates a single lifter plate 20, which rides on a single guide rail 18. It is alternatively possible for the window regulator 16 to have a dual rail configuration, which utilizes two lifter plates, riding on two rails. In a dual rail configuration, the motor 26 would be positioned between the rails, and would be connected to the two lifter plates by a more complex cable assembly.

While the window drive mechanism 22 is shown as including an electric motor 26, it is alternatively possible for the window drive mechanism to be manually operated, and to include a window crank instead of a motor, for driving the movement of the lifter plate 20 and window 14 (FIG. 8).

Referring to FIG. 8, the window interlock 24 includes a sensing mechanism 28 and a door stop mechanism 30. The sensing mechanism 28 is used to detect when the window 14 is open by more than a selected amount (ie. to detect when the window 14 has been opened at least to a selected position). The selected amount and selected position may be selected based on any suitable criteria. For example, it may be based on whether a child of a certain age having a head that is of a certain size, could fit their head through the opening.

Figure 1:
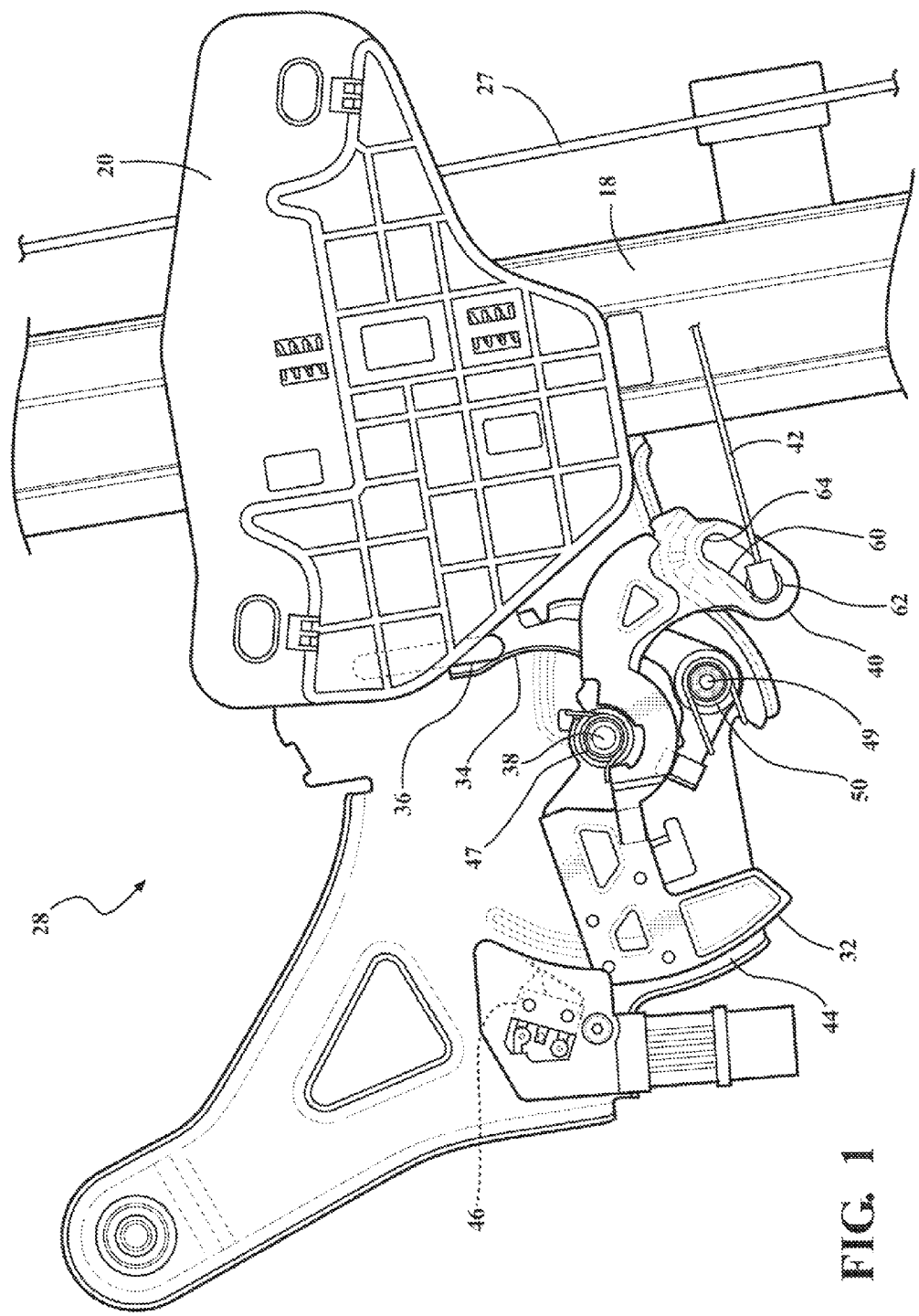
FIG. 1 is a plan view of a portion of a window regulator in accordance with an embodiment of the present invention, in a first position.

Referring to FIG. 1, the sensing mechanism 28 includes a ratchet 32, a pawl 34, and a driving member 36 that is both a ratchet driving member and a pawl driving member. The ratchet 32 is movable between a first position shown in FIGS. 1, 1a and 1b, and a second position shown in FIGS. 5, 5a, 5b and 5c. In the embodiment shown, when the ratchet 32 is in the first position, it is indicative that the window 14 (FIG. 8) is open by less than the selected amount, and when the ratchet 32 is held in the second position, it is indicative that the window 14 (FIG. 8) is open by at least the selected amount, which in turn indicates that there is a danger to a vehicle occupant of pinching their head or a limb if the vehicle door 14 is opened too far. In the embodiment shown, the ratchet 32 pivots between the first and second positions, about a ratchet pivot axis 38 (FIG. 1).

The ratchet 32 includes a cable actuation member 40 which is connected to a first end of a cable 42. The second end of the cable 42 is connected to a door interlock member 52 (FIG. 8) that is part of the door stop mechanism 30. Thus, the cable 42 operatively connects the ratchet 32 (FIG. 1) to the door interlock member 52 (FIG. 8). Movement of the ratchet 32 to the second position (FIGS. 5, 5a, 5b and 5c) actuates the cable 42, which in turn causes movement of the door interlock member 52 to an interlock position (FIG. 9) to prevent the vehicle door 12 from opening by more than a selected amount (ie. by opening past a selected opening position). Movement of the ratchet 32 to the first position causes the door interlock member 52 to move to a bypass position (FIG. 8) to permit the vehicle door 12 to be fully opened.

The ratchet 32 further includes a sensor trip member 44, which trips a sensor 46 (FIG. 5a) when the ratchet 32 moves to the second position.

The ratchet 32 is biased towards the first position (FIG. 1, 1a, 1b) by a ratchet biasing member 47, which may be any suitable member, such as a torsion spring.

The ratchet 32 further includes a locking shoulder 48 (FIGS. 1a and 1b) that is configured to engage the pawl 34 (FIGS. 5, 5a, 5b and 5c) to hold the ratchet 32 in the second position, (ie. by preventing the ratchet 32 from leaving the second position under the bias of the ratchet biasing member 47), discussed in further detail below.

The pawl 34 is movable between a ratchet release position (FIG. 1, 1a, 1b) and a ratchet locking position (FIGS. 5, 5a, 5b and 5c). In the embodiment shown, the pawl 34 pivots between the ratchet release and ratchet locking positions about a pawl pivot axis 49. In the ratchet locking position, the pawl 34 holds the ratchet 32 in the second position. In the ratchet release position, the pawl 34 permits the ratchet to move between the first and second positions. When the ratchet 32 is in the first position, the pawl 34 may rest against it while in the ratchet release position, as shown in FIG. 1b.

The pawl 34 is biased towards the ratchet locking position by a pawl biasing member 50 which may be any suitable member, such as a torsion spring.

The driving member 36 may be connected in any suitable way for movement with the lifter plate 20. For example, the driving member 36 may be connected directly to the lifter plate 20, and is preferably integrally formed with the lifter plate 20. Through the driving member 36, the lifter plate 20 is operatively connected to the ratchet 32 to control the movement of the ratchet 32. Through the driving member 36, the lifter plate 20 is also operatively connected to the pawl 34 to move the pawl 34 between the ratchet release position and the ratchet locking position.

When the window 14 is closed or is open by a small amount, (ie. when the lifter plate 20 has not yet reached a first selected position) the driving member 36 does not engage the pawl 34 or ratchet 32, the ratchet 32 is in the first position, and the pawl 34 is in the ratchet release position.

Figure 1A:
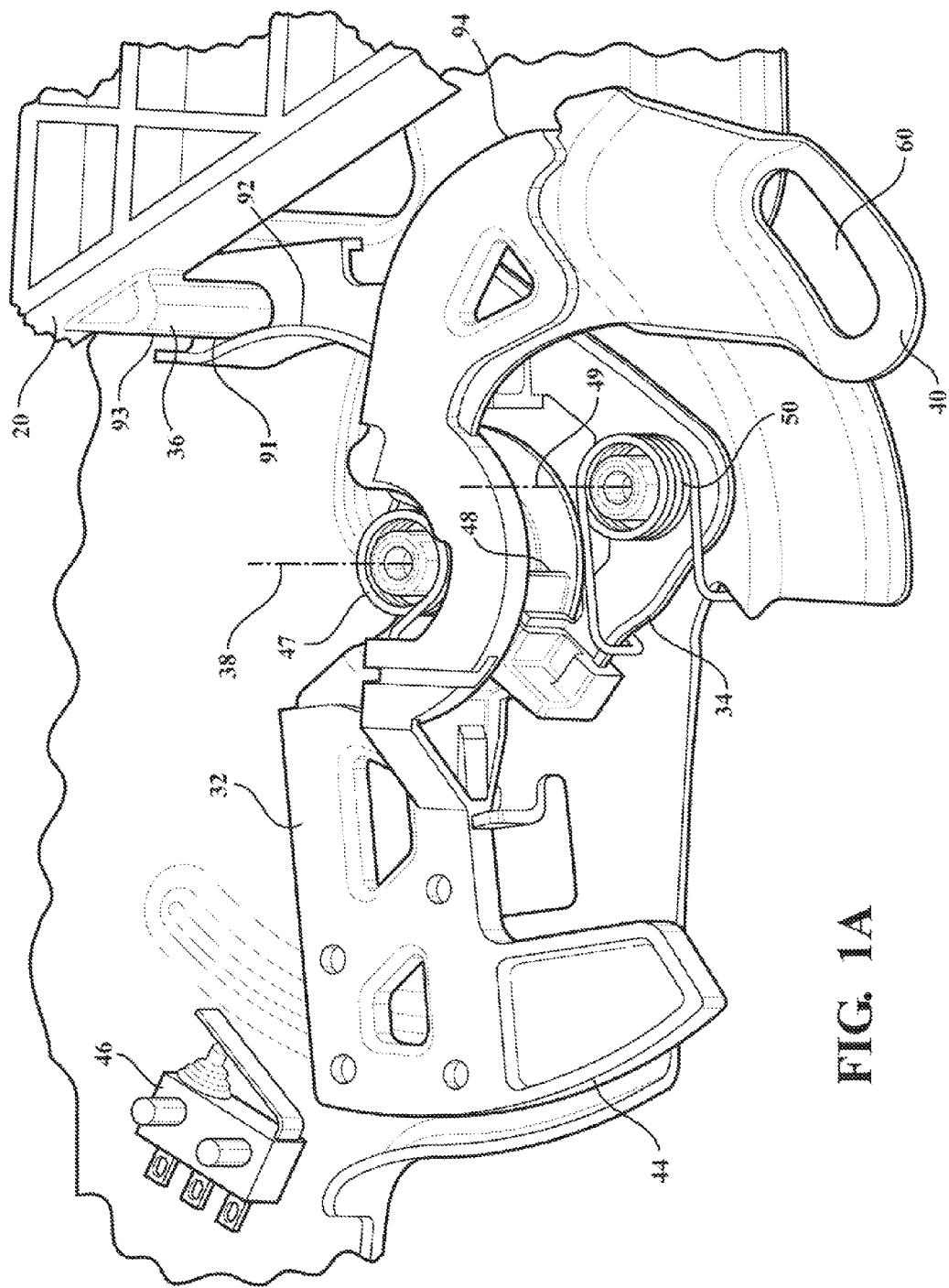
FIG. 1a is a perspective view of the portion of the window regulator shown in FIG. 1.

As the window 14 is opened, the window 14, the lifter plate 20 and the driving member 36 reach a first selected position whereat the driving member 36 engages the pawl 34 (shown in FIGS. 1, 1*a* and 1*b*). Further opening of the window 36, the lifter plate 20 and the driving member 36 cause the pawl 34 to rotate slightly away from the ratchet 32 to a separating position shown in FIG. 2*b*. This movement of the pawl 34 away from the ratchet 32 separates the pawl 34 and the ratchet 32 from each other in the event that they became fixedly connected together. For example, in cold climates, if the ratchet 32 and pawl 34 are left in the position shown in FIG. 1*b* for some length of time, any moisture that is present between the pawl 34 and the ratchet 32 could potentially freeze, thereby fixedly connecting the ratchet 32 and pawl 34 together. This aforementioned movement of the pawl 34 away from the ratchet 32 as shown in FIG. 2*b*, breaks the fixed connection formed between them by the ice, thereby separating them. It is preferable that the pawl 34 move approximately directly away from the ratchet 32, which may be the direction that will require the least effort to break a connection between the pawl 34 and ratchet 32 in the event that they freeze together.

As shown in FIGS. 3, 3*a*, 3*b* and 3*c*, during further opening of the window 14, while the driving member 36 is still engaged with the pawl 34 and holds the pawl 34 in the separating position, the driving member 36 engages the ratchet 32 and begins to rotate the ratchet 32 towards the second position (clockwise in the views shown in FIGS. 1-5*c*).

As the window 14 is further opened, while the driving member 36 is still engaged with the pawl 34 and holds the pawl 34 in the separating position, the driving member 36 drives the ratchet 32 past its second position to a separating position.

Figure 4B:
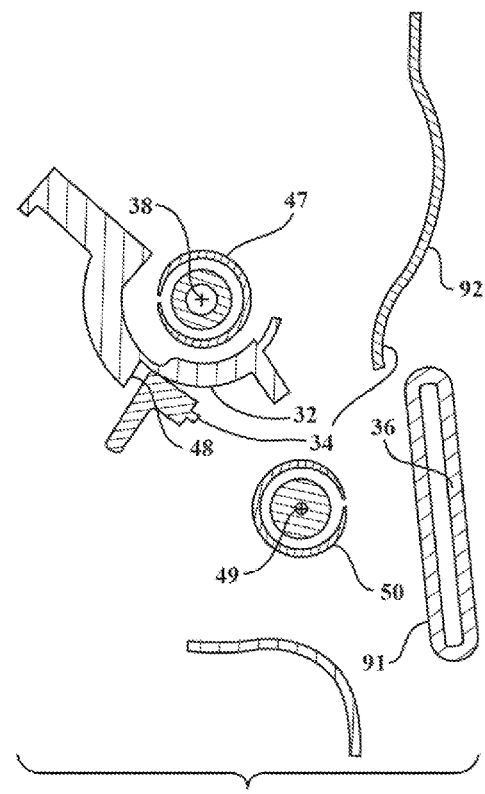
Figure 4A:
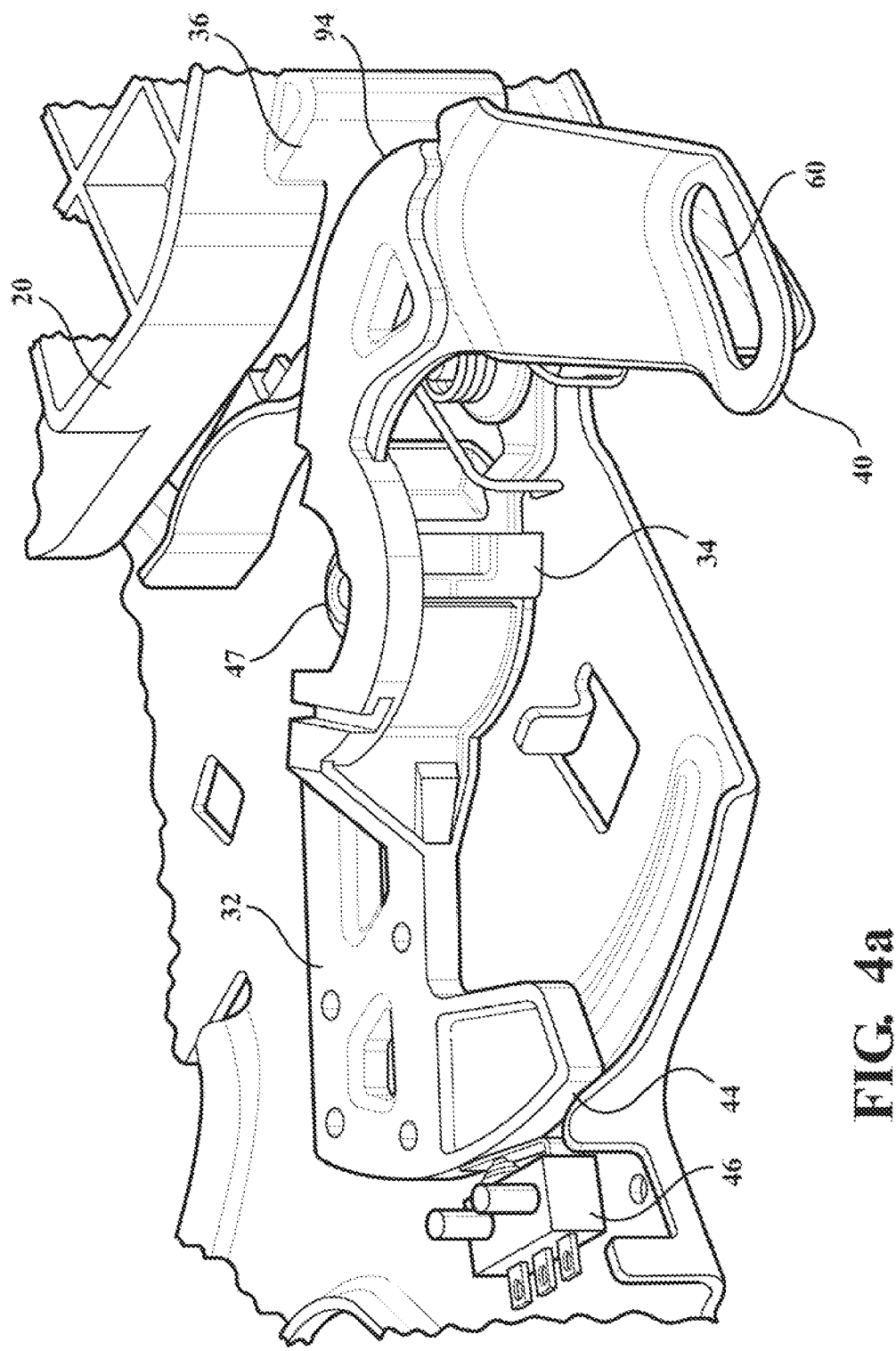
FIG. 4a is a perspective view of the portion of the window regulator shown in FIG. 1, in a fourth position.

As the window 14 is further opened, the movement of the driving member 36 no longer holds the pawl 32 in its separation position and the movement of the lifter plate 20 and driving member 36 towards the fully-open position permits the movement of the pawl 34 towards its ratchet locking position under the biasing force of the pawl biasing member 50. Note that during this stage of movement the driving member 36 continues to hold the ratchet 32 in its separation position. As the window 14, the lifter plate 20 and the driving member 36 continue to move towards the fully-open position, the pawl 34 reaches the ratchet locking position, which is shown in FIGS. 4*a*, 4*b* and 4*c*, at which point it contacts a surface of the ratchet 32 and cannot rotate further clockwise. At this point, the driving member 36 continues to hold the ratchet 32 in the separation position.

As the driving member 36 continues to move further downwardly it no longer holds the ratchet 32 in its separating position and the movement of the driving member 36 permits the ratchet 32 to move counterclockwise towards its second position under the biasing force of the ratchet biasing member 47. Movement of the lifter plate 20 (and thus the driving member 36) to at least the selected position shown in FIGS. 5, 5*a*, 5*b* and 5*c* brings the ratchet 32 to its second position whereat the ratchet 32 engages the pawl 34 and cannot rotate further counterclockwise. At this point continued movement of the window 14, the lifter plate 20 and the driving member 36 towards the fully open position disengages the driving member 36 from the ratchet 32 and thus leaves the ratchet 32 in the second position.

Closing of the window 14 may be similar but opposite to the opening of the window 14. As the window 14, the lifter plate 20 and the driving member 36 are moved from the fully-open position (or from any position wherein they were open past the position shown in FIG. 5) toward the fully-closed position, the window 14 reaches the selected point shown in FIG. 5, wherein the driver member 36 engages the ratchet 32, at which point further movement of the driver member 36 upwards moves the ratchet 32 away from the pawl 34, to the ratchet's separation position shown in FIGS. 4*a*, 4*b* and 4*c*, thereby breaking any fixed connection that may have formed between them resulting from ice buildup or the like. It is preferable that the ratchet 32 move approximately directly away from the pawl 34, which may be the direction that will require the least effort to break a connection between the pawl 34 and ratchet 32 in the event that they freeze together. At this point, the driver member 36 has not caused the pawl 34 to move from the ratchet locking position.

As the window 14, the lifter plate 20 and the driving member 36 are closed further, the driver member 36 engages the pawl 34 and moves the pawl 34 out of its ratchet locking position towards its ratchet release position, while holding the ratchet 32 in the separation position. The continued movement of the window 14, the lifter plate 20 and the driving member 36 towards the fully-closed position brings the pawl 34 to the separation position, at which point both the ratchet 32 and the pawl 34 are in their respective separation positions. Yet further continued movement of the window 14, lifter plate 30 and driving member 36 permits movement of the ratchet 32 towards its first position, while holding the pawl 34 in the separation position, as shown in FIGS. 3, 3*a*, 3*b* and 3*c*.

As the window 14, the lifter plate 20 and the driver member 36 continues to move towards the fully-closed position, the ratchet 32 reaches its first position, while the pawl 34 is held still in its separation position, as shown in FIGS. 2*a* and 2*b*. Continued movement of the window 14, the lifter plate 20 and the driver member 36 towards the fully-closed position brings the pawl 34 to the ratchet release position as shown in FIGS. 1, 1*a* and 1*b* at which point the pawl 34 is in contact with the ratchet 32 and is thus prevented from further movement clockwise. Thus, further movement of the window 14, the lifter plate 20 and the driver member 36 towards (and all the way to) the fully-closed position brings the driver member 36 away from engagement with the pawl 34.

It will be noted that the engagement between the driver member 36 and the pawl 34 is always between two surfaces at least one of which is arcuate. It is also noted that the pawl engagement surface of the driver member 36, shown at 91 and the driver member engagement surface of the pawl 34, shown at 92 are both free of any discontinuities. It will further be noted that the driving member 36 initially engages the pawl 34 at a shallow angle during movement of the lifter plate 20 towards the fully-open position. It will further be noted that the surfaces 91 and 92 are engaged with each other throughout movement of the pawl 34 from the ratchet release position to the ratchet locking position, so that the entire movement of the pawl 34 is controlled and guided. As a result of these features, movements between the driving member 36 and the pawl 34 are gradual, thereby reducing the potential for unwanted noises being emitted from operation of the sensor mechanism 28.

It will also be noted that the engagement between the driver member 36 and the ratchet 32 is similarly always between two surfaces at least one of which is arcuate, and that the ratchet engagement surface of the driver member 36, shown at 93 (which is shown as being immediately above the pawl engagement surface 91) and the driver member engagement surface of the ratchet 32, shown at 94 are both free of any discontinuities. It will further be noted that the driving member 36 initially engages the ratchet 32 at a shallow angle during movement of the lifter plate 20 towards the fully-closed position. It will further be noted that the surfaces 93 and 94 are engaged with each other throughout movement of the ratchet 32 from the between the first and second positions, so that the entire movement of the ratchet 32 is controlled and guided. As a result of these features, movements between the driving member 36 and the ratchet 32 are gradual, thereby reducing the potential for unwanted noises being emitted from operation of the sensor mechanism 28.

Figure 9:
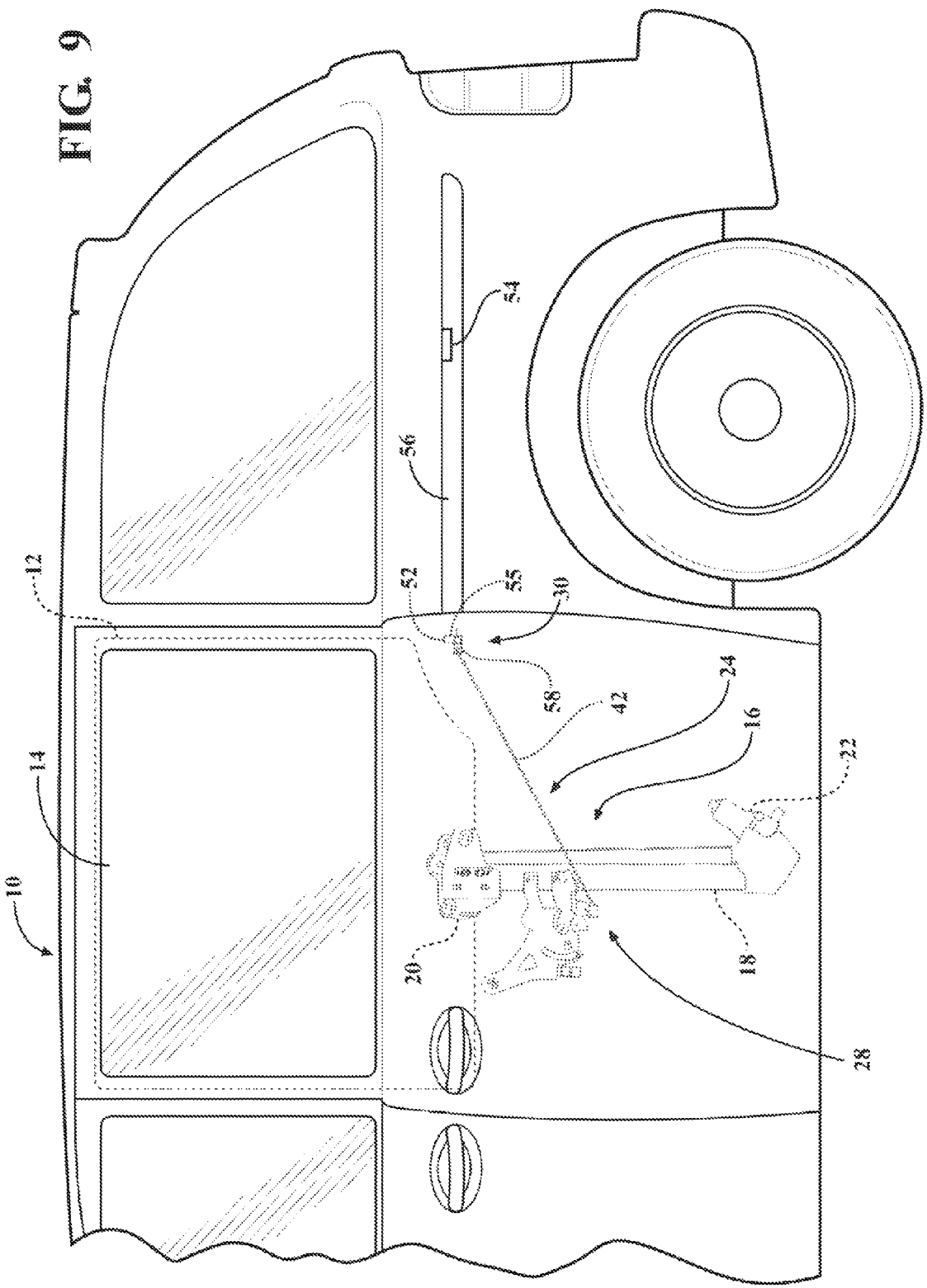
FIG. 9 is another side elevation view of the vehicle shown in FIG. 8, showing the door stop mechanism in a position to prevent fully opening the vehicle door.

The door stop mechanism 30 includes the door interlock member 52 and a limit member 54 (FIG. 8). The door interlock member 52 is movable between a bypass position (FIG. 8) and an interlock position (FIG. 9). In the embodiment shown, the door interlock member 52 is a lever that pivots between the bypass and interlock positions about an interlock member pivot axis 55. When the door interlock member 52 is in the bypass position, as the door 12 moves along the track shown at 56 the interlock member 52 bypasses the limit member 54 that is positioned in the track 56, and so the door is permitted to open all the way to its fully-open position. When the door interlock member 52 is in the interlock position (FIG. 9) as the door 12 moves along the track 56, the interlock member 52 engages the limit member 54 which prevents the door 12 from opening beyond a selected amount. An interlock member biasing member shown at 58 is provided for biasing the interlock member 52 towards the bypass position. The interlock member biasing member 58 may be any suitable type of member, such as a torsion spring.

The cable 42 operatively connects the ratchet 32 to the door interlock member 52 so that movement of the ratchet 32 to the second position moves the interlock member 52 to the interlock position (FIG. 9). When the ratchet 32 moves back to the first position, the interlock member biasing member 58 moves the interlock member 52 back to its bypass position.

Figure 3:
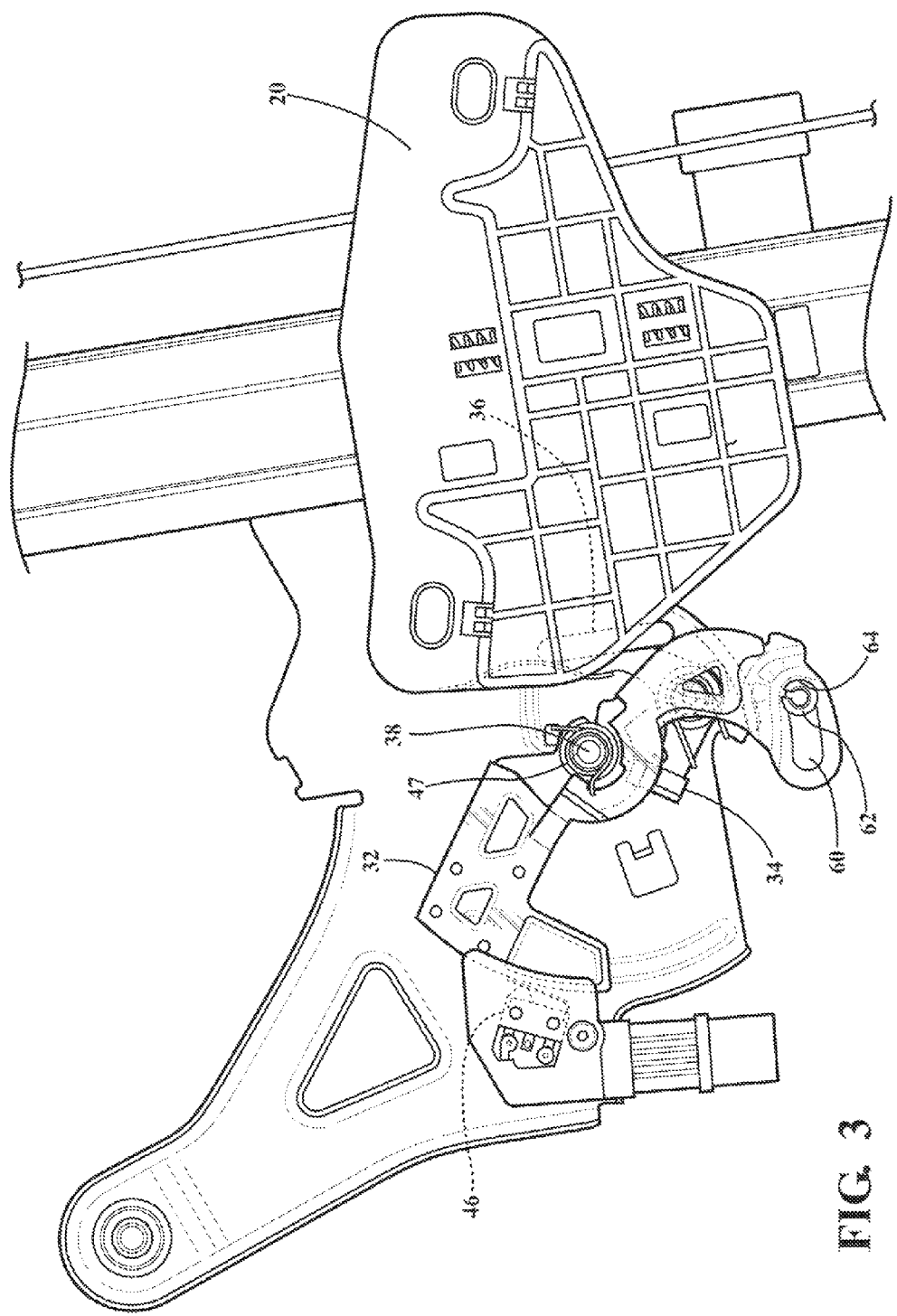
FIG. 3 is a plan view of the window regulator shown in FIG. 1, in a third position.
Figure 3B:
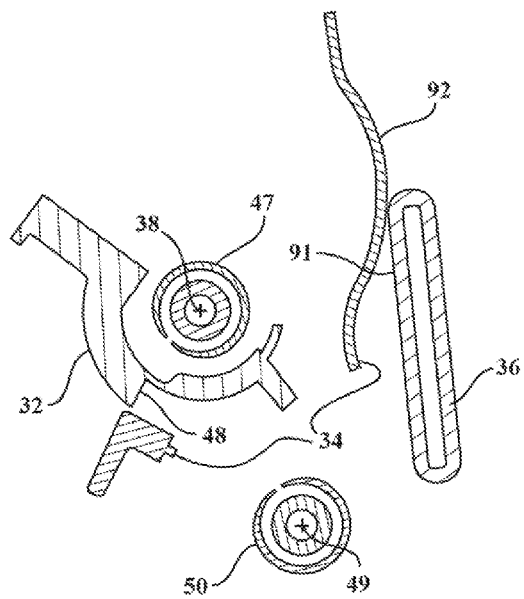
FIG. 3b is a sectional plan view of several components from the window regulator in the position shown in FIG. 3.
Figure 5:
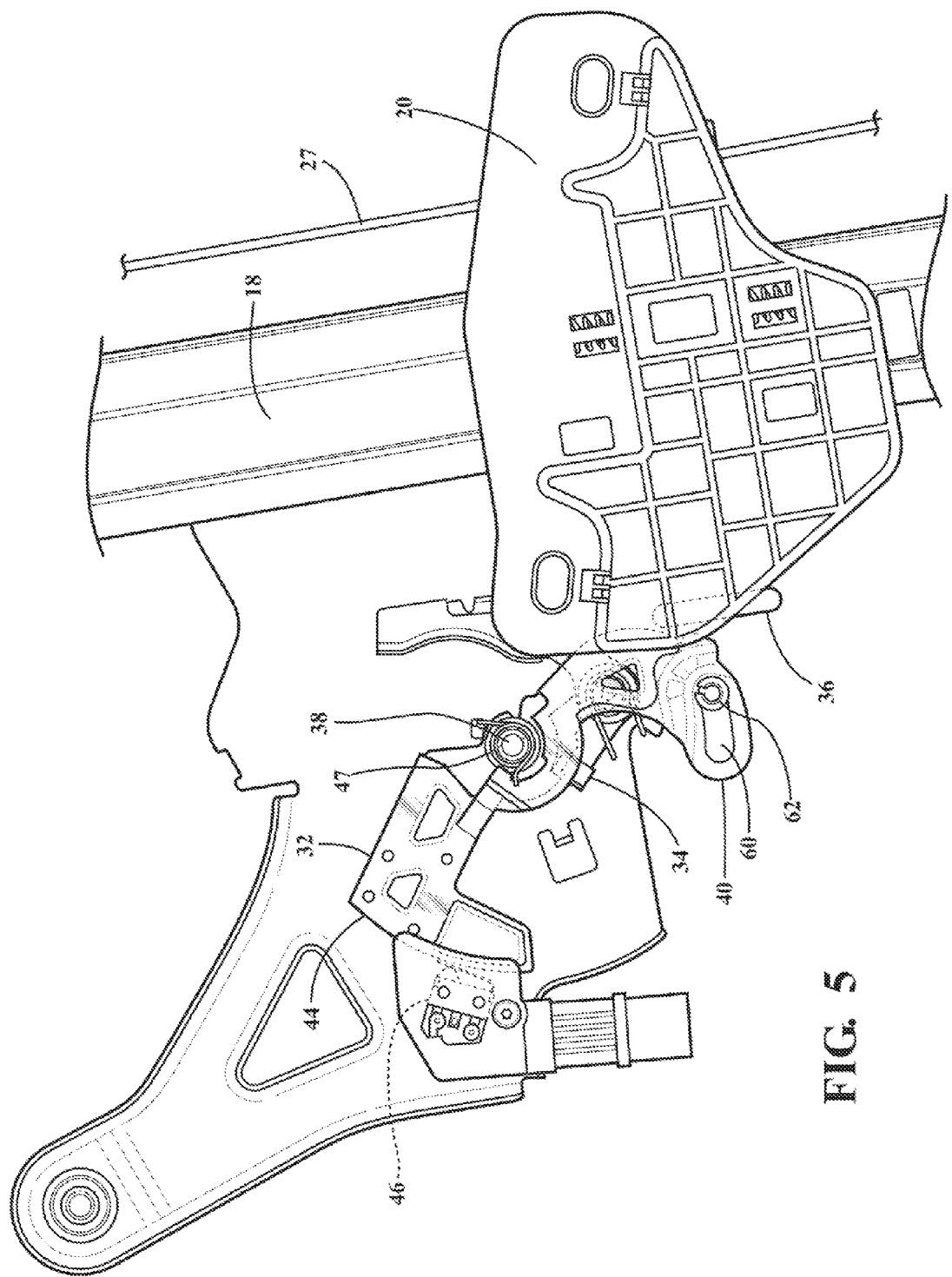
FIG. 5 is a plan view of the window regulator shown in FIG. 1, in a fifth position.
Figure 5A:
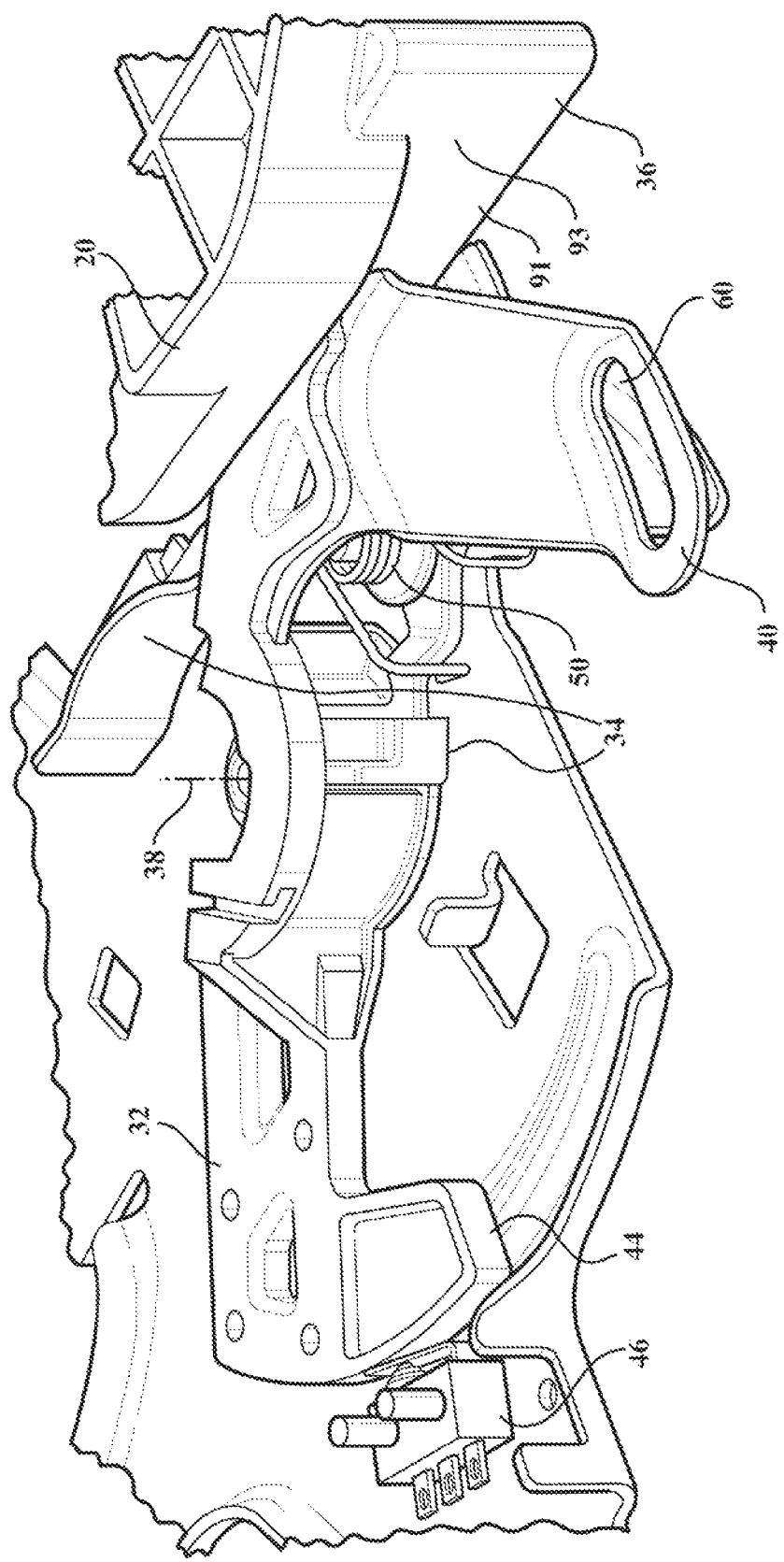
FIG. 5a is a perspective view of the portion of the window regulator in the position shown in FIG. 5.

The connection between the cable 42 and the ratchet 32 may optionally be a lost motion connection as shown in FIGS. 1, 3 and 5, provided by a slot 60 in the ratchet 32, and a pin 62 at the associated end of the cable 42. As such, when the ratchet 32 first rotates away from the first position, it does not actuate the cable 42. Instead, the movement of the ratchet 32 moves the pin 62 along the slot 60 closer to the actuating end of the slot 60, which is shown at 64. At some point during the movement of the ratchet 32 towards the second position, the pin 62 is engaged by the actuating end 64 of the slot 60 and the cable 42 is actuated (FIGS. 3 and 5), pulling the interlock member 52 (FIG. 8) out of the bypass position towards the interlock position. Thus, an initial portion of the movement of the ratchet 32 from the first position to the second position generates no movement of the door interlock member 52 away from the bypass position, and a final portion of the movement of the ratchet 32 from the first position to the second position generates movement of the door interlock member 52 to the interlock position.

This structure permits the movement of the interlock member 52 from its bypass position to the interlock position with relatively little movement of the window 14.

Similarly, the initial movement of the ratchet 32 back from its second position towards its first position relaxes the cable 42 which permits the biasing member 58 to drive the interlock member 52 out of its interlock position back to its bypass position. Thus, relatively little movement of the window 14 is required to move the interlock member 52 back to its bypass position.

Aside from the actuation of the cable 42, the movement of the ratchet 32 changes the state of the sensor 46, as noted above. In the embodiment shown the sensor trip member 44 closes a contact on the sensor 46 when the ratchet 32 moves to the second position, however it is alternatively possible to provide an embodiment wherein the sensor 46 is positioned so that it is engaged by the sensor trip member 44 when the ratchet 32 is in the first position and movement of the ratchet 32 to the second position disengages the trip member 44 from the sensor, thereby opening the contact on the sensor 46.

The sensor 46 may be connected to any suitable device such as a controller that monitors the state of the window 14.

In the embodiment shown, it will be noted that the completion of the movement of the ratchet 32 between the first and second positions does not occur by movement of the window 14 past a single point but instead takes place as the window 14 moves over a small range of movement between a first selected position, shown in FIGS. 1, 1a and 1b, and a second selected position, shown in FIGS. 5, 5a, 5b and 5c. During opening of the window 14, the first selected position determines where movement of the sensing mechanism is initiated, and the second selected position determines where movement of the sensing mechanism ends. During closing of the window 14, the second selected position determines where movement of the sensing mechanism is initiated, and the first selected position determines where movement of the sensing mechanism ends.

In the embodiment described above, the ratchet 32 moved from the first position to the second position when the window 14, the lifter plate 20 and the driving member 36 were moved towards the fully-open position past a selected position. It is alternatively possible to provide an embodiment wherein the sensing mechanism 28 is configured to cause the ratchet 32 to move from the second position to the first position by opening the window beyond a selected amount. In other words, in this alternative embodiment, when the window 14 is closed, the ratchet 32 would be held in the second position by the pawl 34, and when the window opens beyond a selected amount the pawl 34 is moved so as to release the ratchet 32 back to the first position.

In the embodiment shown in the Figures, the first position of the ratchet 32 is indicative of a state of the window regulator wherein the window 14 has not been opened beyond the selected amount, and the second position of the ratchet 32 is indicative of a state of the window regulator wherein the window has been opened beyond the selected amount. In an alternative embodiment, the second position of the ratchet 32 may be indicative of a state of the window regulator wherein the window 14 has not been opened beyond the selected amount, and the first position of the ratchet 32 is indicative of a state of the window regulator wherein the window has been opened beyond the selected amount. Thus, movement of the ratchet 32 to one of the first and second positions causes movement of the door interlock member 52 to its interlock position to prevent the vehicle door 14 from opening past a selected opening position, and movement of the ratchet 32 to the other of the first and second positions causes movement of the door interlock member 52 to a bypass position to permit the vehicle door 14 to be fully opened.

Figure 10:
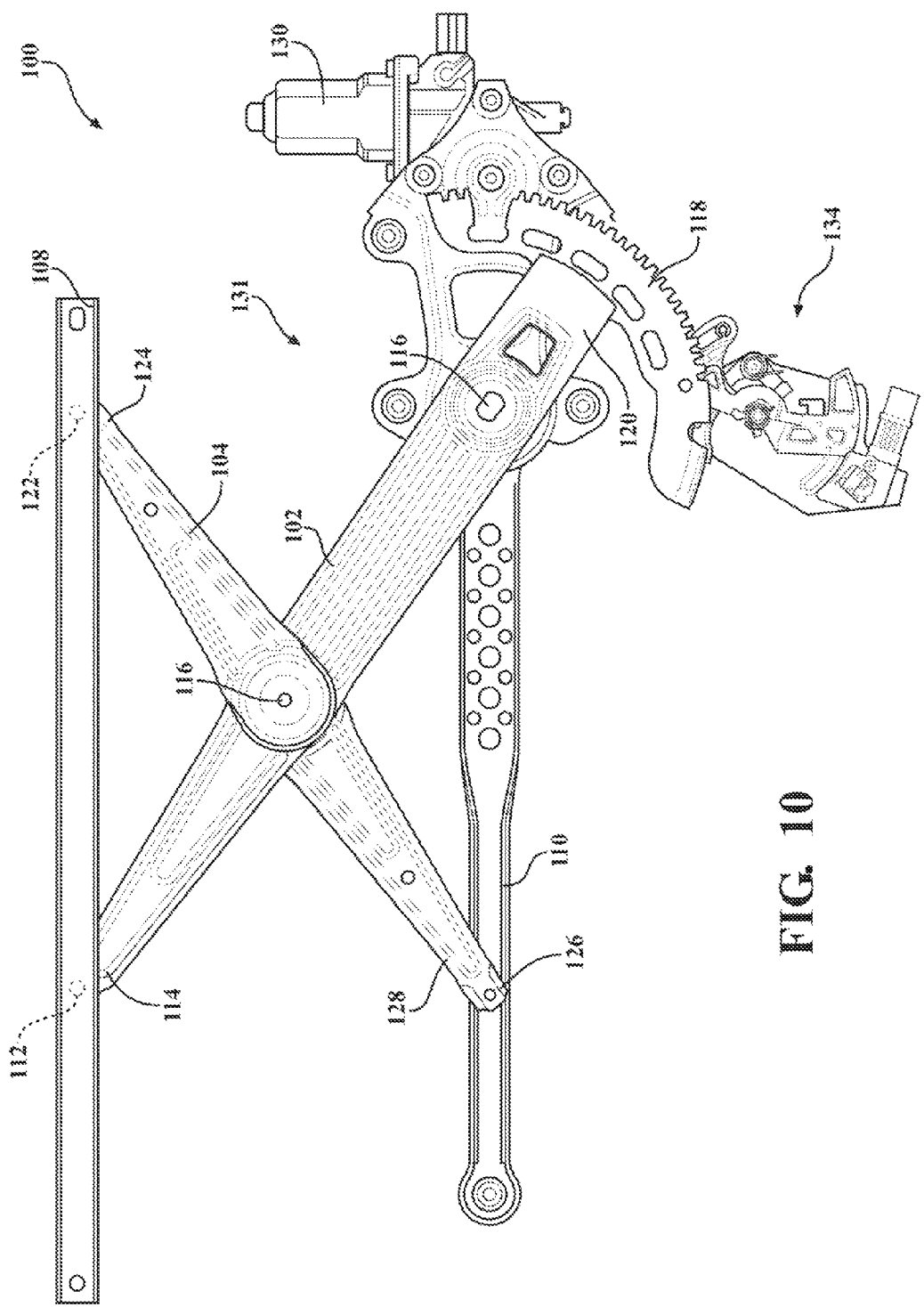
FIG. 10 is a plan view of a window regulator in accordance with another embodiment of the present invention.

Reference is made to FIG. 10, which shows a window regulator 100 in accordance with another embodiment of the present invention. The window regulator 100 is a cross-arm type of regulator, as opposed to the cable-and-drum type of regulator shown in FIGS. 1-9. The window regulator 100 includes a pair of arms 102 and 104 which are pivotally connected to each other at a pivot 106, a moving guide channel 108 which connects to the window (not shown) and thus can be considered part of a lifter plate, and a fixed guide channel 110 which is fixedly connected to the vehicle door (not shown). The first arm 102 is movable with respect to the moving guide channel 108 by means of a roller or slider 112 at a first end 114 that rolls or slides in the moving guide channel 108. The first arm 102 is pivotable about a fixed pivot axis 116 and further includes a sector gear 118 at a second end 120.

The second arm 104 is movable with respect to the moving guide channel 108 by means of a roller 122 at a first end 124 that is movable in the moving guide channel 108. The second arm 104 is movable with respect to the moving guide channel 108 by means of a roller 126 at a second end 128 that is rollable or slidable in the fixed guide channel 110.

A motor 130 is operatively connected to the sector gear 118 by any suitable means known in the art. Rotation of the motor 130 thereby drives the first arm 102 to pivot about the pivot axis 116, thereby raising or lowering the moving guide channel 108 (and therefore the window) depending on the direction of rotation of the motor 130. The motor 130 and any associated gears and the first and second arms 102 and 104 make up a window drive mechanism 131.

Figure 11:
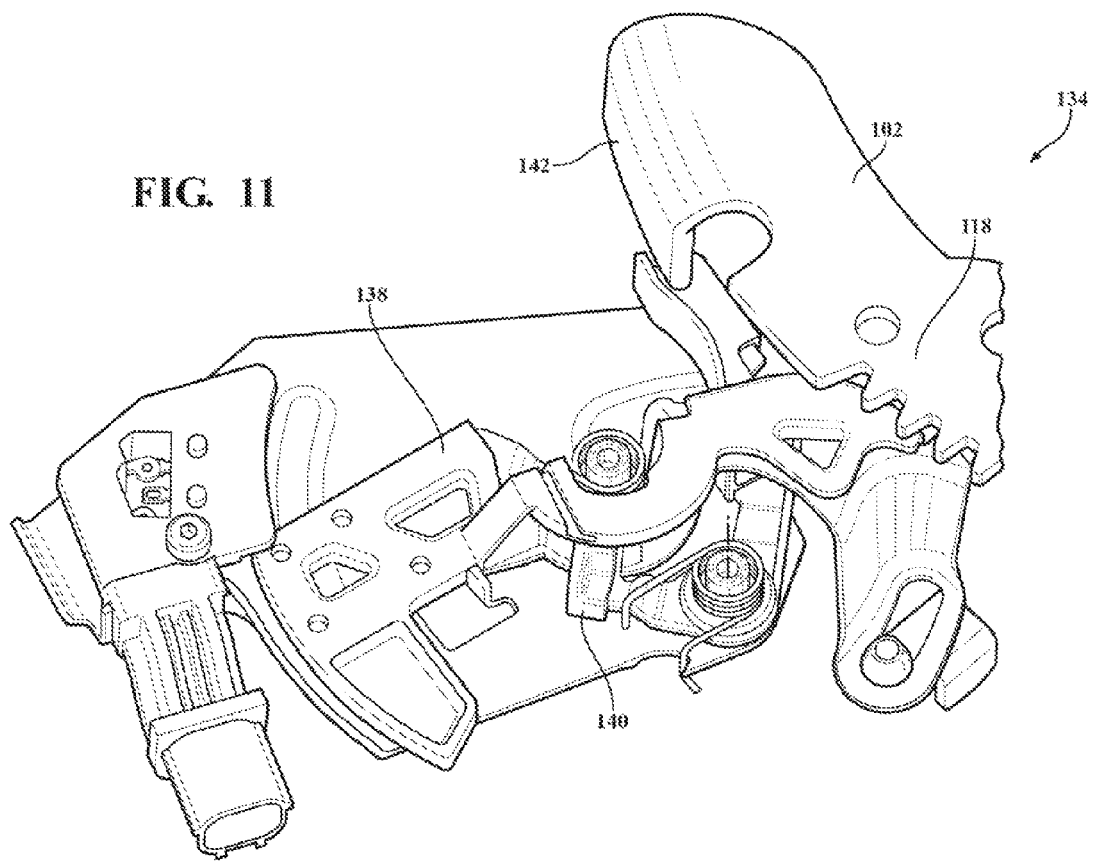
FIG. 11 is a magnified perspective view of a portion of the window regulator shown in FIG. 10.

The window regulator 100 includes a window interlock that determines whether the window (not shown) is open far enough that it presents a safety danger to a vehicle occupant during opening of the vehicle door 12. The window interlock may be similar to the window interlock 24 (FIG. 8) and may thus include a sensing mechanism 134 and a door stop mechanism that is similar to the door stop mechanism 30 shown in FIG. 8. Referring to FIG. 11, the sensing mechanism 134 may be similar to the sensing mechanism 28 (FIG. 1) and includes a ratchet 138, a pawl 140, and a driving member 142 which may be similar to the ratchet 32, the pawl 34 and the driving member 36 shown in FIG. 1. The driving member 142 may be provided at an end of the sector gear 118 on the first arm 102.

While the above description constitutes a plurality of embodiments of the present invention, it will be appreciated that the present invention is susceptible to further modification and change without departing from the fair meaning of the accompanying claims.

We claim:

1. A window regulator for a vehicle window on a sliding vehicle door, comprising:
    a lifter plate configured to hold the vehicle window and wherein the lifter plate is movable between a fully-open position and a fully-closed position;
    a window drive mechanism operatively connected to the lifter plate for driving the movement of the lifter plate between the fully-open and fully-closed positions;
    a ratchet that is movable between a first position and a second position, wherein the ratchet is biased towards the first position, wherein movement of the ratchet to one of the first and second positions causes movement of a door interlock member to an interlock position to prevent the vehicle door from opening past a selected opening position, and wherein movement of the ratchet to the other of the first and second positions causes movement of the door interlock member to a bypass position to permit the vehicle door to be fully opened, wherein the lifter plate is operatively connected to the ratchet such that movement of the lifter plate at least to a selected position moves the ratchet from the first position to the second position; and
    a pawl that is movable between a ratchet locking position and a ratchet release position, wherein when the pawl is in the ratchet locking position the pawl holds the ratchet in the second position and when the pawl in the ratchet release position the pawl permits the ratchet to move between the first and second positions, wherein the pawl is biased towards the ratchet locking position, wherein the lifter plate is operatively connected to the pawl to move the pawl between the ratchet locking position and the ratchet release position, and wherein movement of the lifter plate causes at least one movement selected from the group consisting of movement of the pawl away from the ratchet prior to movement of the ratchet away from the first position so as to separate the pawl and the ratchet from each other in the event that the pawl and the ratchet become fixedly connected together, and movement of the ratchet away from the pawl prior to movement of the pawl away from the ratchet locking position so as to separate the pawl and the ratchet from each other in the event that the pawl and the ratchet become fixedly connected together.

2. A window regulator as claimed in claim 1, wherein movement of the ratchet to the first position causes movement of the door interlock member to the interlock position, and wherein movement of the ratchet to the second position causes movement of the door interlock member to the bypass position,
    and wherein movement of the lifter plate at least to a selected position in a direction towards the fully-open position moves the ratchet from the first position to the second position.

3. A window regulator as claimed in claim 1, wherein the window drive mechanism includes an electric motor and a cable assembly that operatively connects the electric motor to the lifter plate.

4. A window regulator as claimed in claim 1, further comprising a sensor that is actuatable by movement of the ratchet from one of the first and second positions to the other of the first and second positions, wherein the state of the sensor indicates to a control device which of the first and second positions the ratchet is in.

5. A window regulator as claimed in claim 1, wherein when the ratchet is in the first position and the pawl is in the ratchet release position the pawl is engaged with the ratchet.

6. A window regulator as claimed in claim 1, further comprising a ratchet driving member connected to the lifter plate and positioned to move the ratchet from the first position to the second position during movement of the lifter plate,
    and further comprising a pawl driving member connected to the lifter plate and positioned to move the pawl from the ratchet release position to the ratchet locking position during movement of the lifter plate.

7. A window regulator as claimed in claim 6, wherein the ratchet driving member and the pawl driving member are the same member.

8. A window regulator as claimed in claim 6, wherein the pawl driving member and the pawl are positioned to initially engage each other at a shallow relative angle.

9. A window regulator as claimed in claim 6, wherein the pawl driving member has a pawl engagement surface and wherein the pawl has a pawl driving member engagement surface, and wherein the surfaces are free of discontinuities.

10. A window regulator as claimed in claim 9, wherein the surfaces are engaged with each other throughout movement of the pawl from the ratchet release position to the ratchet locking position.

11. A window regulator as claimed in claim 9, wherein the surfaces are engaged with each other throughout movement of the pawl from the ratchet locking position to the ratchet release position.

12. A window regulator as claimed in claim 6, wherein the ratchet driving member has a ratchet engagement surface and wherein the ratchet has a ratchet driving member engagement surface, and wherein the surfaces are free of discontinuous slope changes.

13. A window regulator as claimed in claim 12, wherein the surfaces are engaged with each other throughout movement of the ratchet from the first position to the second position.

14. A window regulator as claimed in claim 13, wherein the surfaces are engaged with each other throughout movement of the ratchet from the second position to the first position.

15. A window regulator as claimed in claim 1, wherein movement of the lifter plate causes movement of the pawl away from the ratchet prior to movement of the ratchet away from the first position so as to separate the pawl and the ratchet from each other in the event that the pawl and the ratchet become fixedly connected together, and causes movement of the ratchet away from the pawl prior to movement of the pawl away from the ratchet locking position so as to separate the pawl and the ratchet from each other in the event that the pawl and the ratchet become fixedly connected together.

16. A window regulator as claimed in claim 6, wherein the ratchet driving member and the ratchet are positioned to initially engage each other at a shallow relative angle.

17. A window regulator as claimed in claim 1, wherein movement of the lifter plate drives the pawl to move approximately directly away from the ratchet prior to movement of the ratchet away from the first position so as to separate the pawl and the ratchet from each other in the event that the pawl and the ratchet become fixedly connected together.

18. A window regulator as claimed in claim 1, wherein movement of the lifter plate drives the ratchet to move approximately directly away from the pawl prior to movement of the pawl away from the ratchet locking position so as to separate the pawl and the ratchet from each other in the event that the pawl and the ratchet become fixedly connected together.

19. A window regulator as claimed in claim 1, wherein the ratchet is connected to a first end of a cable by a lost motion connection, wherein the cable has a second end that is connectable to the door interlock member.

20. A window regulator as claimed in claim 19, wherein the lost motion connection is configured such that an initial portion of the movement of the ratchet from the first position to the second position generates no movement of the door interlock member away from the bypass position, and a final portion of the movement of the ratchet from the first position to the second position generates movement of the door interlock member to the interlock position.

21. A window regulator as claimed in claim 20, wherein the window drive mechanism includes a motor, a first arm pivotally connectable to the sliding vehicle door, wherein the first arm has a sector gear thereon that is drivable by the motor, a second arm pivotally connected to the first arm.

22. A window regulator for a vehicle window on a sliding vehicle door, comprising:
 a guide rail;
 a lifter plate configured to hold the vehicle window and wherein the lifter plate is movable along the guide rail between a fully-open position and a fully-closed position;
 a window drive mechanism operatively connected to the lifter plate for driving the movement of the lifter plate between the fully-open and fully-closed positions;
 a door interlock member movable between an interlock position and a bypass position, wherein in the door interlock position the door interlock member is positioned to engage a limit member on the vehicle body and prevent the vehicle door from opening past a selected opening position, and wherein in the bypass position the door interlock member is positioned to bypass the limit member to permit the vehicle door to be fully opened;
 a ratchet that is movable between a first position and a second position, wherein the ratchet is biased towards the first position, wherein movement of the ratchet to one of the first and second positions causes movement of the door interlock member to the interlock position, and wherein movement of the ratchet to the other of the first and second positions causes movement of the door interlock member to the bypass position, wherein the lifter plate is operatively connected to the ratchet such that movement of the lifter plate at least to a selected position moves the ratchet from the first position to the second position; and
 a pawl that is movable between a ratchet locking position and a ratchet release position, wherein when the pawl is in the ratchet locking position the pawl holds the ratchet in the second position and when the pawl in the ratchet release position the pawl permits the ratchet to move between the first and second positions, wherein the pawl is biased towards the ratchet locking position, wherein the lifter plate is operatively connected to the pawl to move the pawl between the ratchet locking position and the ratchet release position, and wherein movement of the lifter plate causes at least one movement selected from the group consisting of movement of the pawl away from the ratchet prior to movement of the ratchet away from the first position so as to separate the pawl and the ratchet from each other in the event that the pawl and the ratchet become fixedly connected together, and movement of the ratchet away from the pawl prior to movement of the pawl away from the ratchet locking position so as to separate the pawl and the ratchet from each other in the event that the pawl and the ratchet become fixedly connected together.

* * * * *